United States Patent Office 2,904,396

Patented Sept. 15, 1959

2,904,396

PREPARATION OF ALKALI METAL CHROMATE FROM CHROME ORES

Friedrich Schubert, Leverkusen, Germany, assignor to Farbenfabriken Bayer Aktiengesellschaft, Leverkusen, Germany, a corporation of Germany No Drawing. Application March 30, 1955
Serial No. 498,087

3 Claims. (Cl. 23—56)

This invention relates to improvements in the preparation of alkali metal chromate from ores containing chromium and alumina.

It is a general practice to prepare alkali metal chromate by comminuting chrome ore to a small particle size, mixing the comminuted ore with an alkaline reacting alkali metal compound, preferably soda, and calcining the mixture under oxidizing conditions with the addition of a diluent. The diluents are incorporated with the mixture being calcined to avoid sticking and adhering of the reaction mixture. Customary diluents for this purpose are residues of chrome ore and iron oxide. By extracting the calcined mass with water an alkali metal chromate solution results. In order to obtain an optimum yield of alkali metal chromate the alkaline reacting alkali metal compound used in the calcination is added in a large excess. This entails the disadvantage, however, that the final solution, apart from the desired alkali metal chromate, contains undesired quantities of alkali metal aluminate. The aluminate results from the larger or smaller alumina content of the chrome ore.

It is an object of this invention, therefore, to overcome the shortcomings and disadvantages of the processes heretofore utilized in the preparation of alkali metal chromate from chrome ores containing alumina.

It is a further object of this invention to provide a new method for the manufacture of alkali metal chromate from chrome ores, which method does not involve a solution containing substantial amounts of alumina.

It is a further object of this invention to provide an economic and effective method for the recovery of alkali metal chromate in good yields from chrome ores containing alumina.

These and further objects will become apparent to those skilled in the art from the following description.

In accordance with the present invention it has been found that alkali metal chromate can be obtained in good yields from chrome ores containing alumina by treatment with an alkaline reacting alkali metal compound, such as soda, with the addition of iron oxide in an economic and effective process, comprising substantially comminuting chrome ore containing alumina to the usual small particle size, calcining the comminuted ore under oxidizing conditions with an alkaline reacting alkali metal compound in an amount exceeding the stoichiometrical quantity, calculated on chromium, by about 3% to about 10%, with the addition of iron oxide in a quantity of about 10% to about 30%, calculated on the amount of the chrome ore containing alumina used as starting material. In most cases good results are obtained when the chrome ore is calcined with an excess of about 4–6% of for instance soda over the amount stoichiometrically needed for converting the chrome into alkali metal chromate and iron oxide is added in an amount of 10–15%. It is a surprising feature of the invention that an alkali metal chromate solution is obtained, which is free or at least substantially free from alumina, by treating the calcined mass with water. The iron oxide added ensures that the alumina which is concurrently separated from the ore during calcination, is not present in the resulting chromate solution in form of water-soluble alkali metal aluminate, but is retained by the iron oxide. It is not exactly known in what a manner the alumina is retained by the iron oxide, it may be that the alumina is physically bound by the iron oxide or that the alumina reacts chemically with the iron oxide and is transformed during calcination into a water-insoluble compound with the iron oxide, which possibly corresponds to the formula $FeO.Al_2O_3$.

The invention is further illustrated by the following examples without being restricted thereto.

*Example 1*

200 kg. of chrome ore of the following composition:

| | Percent |
|---|---|
| $Cr_2O_3$ | 50.2 |
| $Fe_2O_3$ | 19.3 |
| $Al_2O_3$ | 11.8 |
| MgO | 12.5 |
| CaO | 3.2 |
| $SiO_2$ | 2.5 |
| | 99.5 |

are very finely ground as usual and mixed with 60 kg. of purple ore (roasted pyrite), having a sulfur content of about 1%, and 148 kg. of soda (this is an excess of 5% over the stoichiometrical quantity). The mixture is calcined to 1000° C. for one hour with the admission of air. By extracting with water more than 90% of the initial chromium oxide content are obtained in form of a sodium chromate solution from which solid sodium chromate or bichromate respectively can be recovered by conventional methods. The solution is rapidly filtered from the residue; the sodium chromate solution is free from sodium aluminate.

*Example 2*

200 kg. of chrome ore, having a similar composition as in Example 1, are finely ground and mixed with 60 kg. of a purple ore (roasted pyrite), having a sulfur content of 0.5%, and 144 kg. of soda (this is an excess of 3% over the stoichiometrical quantity). The mixture is calcined at 1000° C. for one hour with the admission of air. By extracting with water, sodium chromate is obtained in a yield of 92%. The residue can easily be separated by filtration and the sodium chromate solution is free from sodium aluminate.

*Example 3*

A mixture of 1500 kg. of chrome ore of the following composition:

| | Percent |
|---|---|
| $Cr_2O_3$ | 46 |
| $SiO_2$ | 1 |
| MgO | 10.3 |
| V | 0.2 |
| $Al_2O_3$ | 16.1 |
| FeO | 26.4 |
| | 100.0 |

966 kg. of soda (this is an excess of 5% over the stoichiometrical quantity) and 450 kg. of a purple ore (roasted pyrite) is fed after calcination in finely pulverized state to a rotary furnace previously heated to 100° C. by an open gas flame. The calcination period of the content of the furnace is calculated so that the mixture is subjected to the aforesaid temperature and oxidation conditions, effected by the admission of air, for about 1.5 hours. The yield of the chromate obtained is 86% calculated on the content of chromium oxide present in the mixture. The sodium chromate solution obtained by extraction with water is free from sodium aluminate.

*Example 4*

A mixture of 100 kg. of chrome ore containing 44% of $Cr_2O_3$, 64.4 kg. of soda (this is an excess of 5% over the stoichiometrical quantity) and 20 kg. of a well calcined purple ore (roasted pyrite) are calcined in a furnace at 970° C. for two hours while passing in air. The yield of sodium chromate obtained is 86.5%. The sodium chromate solution is free from sodium aluminate.

*Example 5*

100 kg. of chrome ore containing 44% of chromium oxide are intimately mixed with 65 kg. of soda (this is an excess of 6% over the stoichiometrical quantity), 20 kg. of purple ore (roasted pyrite) and 10 kg. of the residue obtained by calcining chrome ore as described in the preceding examples, and calcined in a furnace at 960° C. for two hours while passing in air. The yield of sodium chromate is 88.5%. The sodium chromate solution is free from sodium aluminate.

*Example 6*

100 kg. of finely pulverized chrome ore containing 44% of $Cr_2O_3$ are mixed with ferrous sulfate, containing crystal water, in a quantity corresponding to 25 kg. of $Fe_2O_3$, dried while the mass is calcined at high temperature. The resulting mixture of chrome ore and iron oxide is ground, 66 kg. of soda (this is an excess of 6% over the stoichiometrical quantity) are added and the mixture is calcinated at 970° C. for two hours while passing in air. The yield of water-soluble sodium chromate is 88%. The sodium chromate solution obtained is free from sodium aluminate.

*Example 7*

100 kg. of chrome ore of the following composition:

| | Percent |
|---|---|
| $Cr_2O_3$ | 43.6 |
| $SiO_2$ | 3.6 |
| V | 0.2 |
| MgO | 10.9 |
| FeO | 25.7 |
| $Al_2O_3$ | 17.6 |
| | 101.6 |

are finely pulverized and mixed together with 28 kg. of an iron oxide obtained by roasting ferrous sulfate at high temperature, and 65 kg. of soda (this is an excess of 5% over the stoichiometrical quantity). After a calcination period of about two hours at 970° C. as described in the preceding example, water-soluble sodium chromate is obtained in a yield of 88%. The sodium chromate solution obtained is free from sodium aluminate.

*Example 8*

According to the procedure of German Patent 82,980, 10 kg. of chrome ore containing 43.5% of $Cr_2O_3$ and 16.5% of $Fe_2O_3$, the balance being alumina and silica, are finely ground and mixed with soda in a quantity sufficient to open up both the chromium oxide and the aluminum oxide (i.e. 150 kg. of soda; this is an excess of 240% over the stoichiometrical quantity calculated upon the $Cr_2O_3$ content) with the addition of 40 kg. of purple ore roasted pyrite, and then calcined at 1000° C. for one hour while passing in air. By extracting with water more than 90% of the initial chromium oxide content and about 75% of the initial aluminum oxide are dissolved. The solution is filtered at a slow rate in order to accomplish separation of sodium chromate and aluminum oxide. The quantity of soda consumed in the calcination of the aluminum oxide is substantially lost on acidifying with sulfuric acid by transforming the sodium monochromate to sodium bichromate.

*Example 9*

100 kg. of chrome ore containing 46% of $Cr_2O_3$ are finely ground and mixed with 67.3 kg. of soda (this is an excess of 5% over the theoretically required quantity) and 10 g. of iron oxide in form of purple ore (roasted pyrite). After calcining at 100° C. for two hours under oxidizing conditions by passing in air, water-soluble sodium chromate is obtained in a yield of 87.7%. The mass is extracted with water. The filtered solution is entirely clear, shows a pH value of 9 and is free from sodium aluminate.

I claim:

1. A process for the production of alkali metal chromate free from alkali metal aluminate essentially consisting of calcining under oxidizing conditions a mixture of finely divided chrome ore containing alumina, an alkaline reacting alkali metal compound in an amount exceeding the stoichiometric quantity calculated for converting the chrome present in the ore to alkali metal chromate by about 3 to about 10%, and iron oxide in an amount of about 10% to about 30%, calculated upon the quantity of the chrome ore, and recovering an alkali metal chromate solution free from alumina by treating the calcined mass with water.

2. A process for the production of alkali metal chromate free from alkali metal aluminate essentially consisting of calcining under oxidizing conditions a mixture of finely divided chrome ore containing alumina, an alkaline reacting alkali metal compound in an amount exceeding the stoichiometric quantity calculated for converting the chrome present in the ore to alkali metal chromate by about 4 to about 6%, and iron oxide in an amount of about 10% to about 15%, calculated upon the quantity of the chrome ore, and recovering an alkali metal chromate solution free from alumina by treating the calcined mass with water.

3. Process as claimed in claim 1, in which the iron oxide is purple ore (roasted pyrite).

References Cited in the file of this patent

UNITED STATES PATENTS

| | | |
|---|---|---|
| 558,818 | Klimmer | Apr. 21, 1896 |
| 1,723,536 | Weise | Aug. 6, 1929 |

FOREIGN PATENTS

| | | |
|---|---|---|
| 261,647 | Great Britain | Nov. 25, 1926 |

UNITED STATES PATENT OFFICE
CERTIFICATE OF CORRECTION

Patent No. 2,904,396 September 15, 1959

Friedrich Schubert

It is hereby certified that error appears in the printed specification of the above numbered patent requiring correction and that the said Letters Patent should read as corrected below.

Column 3, line 60, for "10 kg." read -- 100 kg. --.

Signed and sealed this 1st day of March 1960.

(SEAL)
Attest:

KARL H. AXLINE
Attesting Officer

ROBERT C. WATSON
Commissioner of Patents